US012632759B2

(12) United States Patent
Park et al.

(10) Patent No.: US 12,632,759 B2
(45) Date of Patent: May 19, 2026

(54) NANOSTRUCTURE CONTROLLING SINGLE PHOTON AND PHOTONIC DEVICE ASSEMBLY COMPRISING THE SAME

(71) Applicant: Korea University Research and Business Foundation, Seoul (KR)

(72) Inventors: Hong-Gyu Park, Seoul (KR); Jae-Pil So, Hanam-si (KR); Kwang-Yong Jung, Wonju-si (KR)

(73) Assignee: Korea University Research and Business Foundation, Seoul (KR)

( * ) Notice: Subject to any disclaimer, the term of this patent is extended or adjusted under 35 U.S.C. 154(b) by 821 days.

(21) Appl. No.: 17/737,514

(22) Filed: May 5, 2022

(65) Prior Publication Data

US 2022/0416905 A1     Dec. 29, 2022

(30) Foreign Application Priority Data

Jun. 25, 2021     (KR) ........................ 10-2021-0083389

(51) Int. Cl.
*G02F 1/017* (2006.01)
*B82Y 20/00* (2011.01)
(Continued)

(52) U.S. Cl.
CPC ............... *G06N 10/40* (2022.01); *G02B 5/30* (2013.01); *G02B 6/12002* (2013.01);
(Continued)

(58) Field of Classification Search
CPC .......... G02F 1/01716–01791; G02F 2202/108; G02B 5/30; G02B 6/1225; G02B 6/126;
(Continued)

(56) References Cited

U.S. PATENT DOCUMENTS

2013/0182995 A1     7/2013   Erickson et al.
2019/0229498 A1*    7/2019   Gwo .................... F02M 35/104
(Continued)

FOREIGN PATENT DOCUMENTS

KR     10-2007-0064106 A     6/2007
KR     10-2017-0106089 A     9/2017
KR     10-2020-0060578 A     6/2020

OTHER PUBLICATIONS

Cotrufo et al., "Enhancing functionalities of atomically thin semi-conductors with plasmonic nanostructures," Nanophotonics 2019; 8(4): 577-598, https://doi.org/10.1515/nanoph-2018-0185. (Year: 2019).*

(Continued)

*Primary Examiner* — Nicholas R. Pasko
(74) *Attorney, Agent, or Firm* — Hauptman Ham, LLP

(57)     ABSTRACT

A nanostructure controlling a single photon which controls both of the position and the polarization direction of a single photon is proposed. An embodiment is a nanostructure controlling a single photon which includes a substrate and at least one insulating film units having a first insulating film and a second insulating film spaced apart from each other on the substrate and in which the portion between the first insulating film and the second insulating film is defined as a first nanogap.

10 Claims, 28 Drawing Sheets
(6 of 28 Drawing Sheet(s) Filed in Color)

(51) Int. Cl.

| | |
|---|---|
| *G02B 5/30* | (2006.01) |
| *G02B 6/12* | (2006.01) |
| *G02B 6/126* | (2006.01) |
| *G06N 10/40* | (2022.01) |
| *H04B 10/70* | (2013.01) |

(52) U.S. Cl.
CPC ......... *G02B 6/126* (2013.01); *G02F 1/01716* (2013.01); *G02F 1/01766* (2021.01); *G02F 1/01791* (2021.01); *H04B 10/70* (2013.01); *B82Y 20/00* (2013.01); *G02F 2202/108* (2013.01)

(58) Field of Classification Search
CPC ........ G02B 2006/12128; H01S 5/3412; H04B 10/70; G06N 10/40
See application file for complete search history.

(56) References Cited

U.S. PATENT DOCUMENTS

| | | | | |
|---|---|---|---|---|
| 2019/0288160 | A1* | 9/2019 | Atature | H10H 29/142 |
| 2020/0112139 | A1* | 4/2020 | Lodahl | H01S 5/1042 |
| 2021/0091240 | A1* | 3/2021 | Pettes | H10F 77/306 |
| 2022/0317335 | A1* | 10/2022 | Shalaev | H10N 99/00 |
| 2022/0381979 | A1* | 12/2022 | Brash | G02B 6/126 |

OTHER PUBLICATIONS

Gallardo, et al. "Emission polarization control in semiconductor quantum dots coupled to a photonic crystal microcavity," Optics Express, vol. 18, No. 12, Jun. 7, 2010, 13301-13308, https://doi.org/10.1364/OE.18.013301. (Year: 2010).*

Iff et al., "Purcell-Enhanced Single Photon Source Based on a Deterministically Placed WSe2 Monolayer Quantum Dot in a Circular Bragg Grating Cavity," Nano Letters 2021 21 (11), 4715-4720, DOI: 10.1021/acs.nanolett.1c00978 (Year: 2021).*

So, et al., "Polarization control of deterministic single-photon emitters in monolayer WSe2," Nano Lett. 2021, 21, 1546-1554, https://dx.doi.org/10.1021/acs.nanolett.1c00078. (Year: 2021).*

Peyskens et al., "Integration of single photon emitters in 2D layered materials with a silicon nitride photonic chip," Nature Communications, 2019, 10:4435, https://doi.org/10.1038/s41467-019-12421-0. (Year: 2019).*

Sortino et al., "Enhanced light-matter interaction in an atomically thin semiconductor coupled with dielectric nano-antennas," Nature Communications, 2019, 10: 5119, https://doi.org/10.1038/s41467-019-12963-3. (Year: 2019).*

Tonndorf, et al., "Single-photon emission from localized excitons in an atomically thin semiconductors," Optica, vol. 2, No. 4, Apr. 2015, 347-352, http://dx.doi.org/10.1364/OPTICA.2.000347. (Year: 2015).*

Wang et al., "Highly polarized single photons from strain-induced quasi-1D localized excitons in WSe2," Nano Lett. 2021, 21, 7175-7182, https://doi.org/10.1021/acs.nanolett.1c01927. (Year: 2021).*

Zhang et al., "Photonic-crystal exciton-polaritons in monolayer semiconductors," Nature Communications, 2018, 9:713, DOI: 10.1038/s41467-018-03188-x. (Year: 2018).*

Poumirol et al., "Unveiling the optical emission channels of monolayer semiconductors coupled to silicon nanoantennas," ACS Photonics 2020, 7, 3106-3115, https://doi.org/10.1021/acsphotonics.0c01175. (Year: 2020).*

Kern et al., "Nanoscale positioning of single-photon emitters in atomically thin WSe2," Adv. Matter, 2016, 28, 7101-7105, DOI: 10.1002/adma.201600560. (Year: 2016).*

Korean Office Action dated Nov. 9, 2023 for corresponding Korean Patent Application No. 10-2021-0083389, along with English machine translation (9 pages).

Notice of Allowance dated Jun. 24, 2024 for corresponding Korean Patent Application No. 10-2021-0083389, along with an English translation (4 pages).

Peyskens et al., "Integration of single photon emitters in 2D layered materials with a silicon nitride photonic chip," Nature Communications, 2019, vol. 10, article No. 4435, pp. 1-7.

Tripathi et al., "Spontaneous emission enhancement in strain-induced WSe2 monolayer based quantum light sources on metallic surfaces," arXiv, Mar. 22, 2018, arXiv:1709.00631v2, pp. 1-22.

Kim et al., "Position and Frequency Control of Strain-Induced Quantum Emitters in WSe2 Monolayers," Nano Letters, Sep. 6, 2019, vol. 19, pp. 7534-7539.

Kumar et al., "Strain-Induced Spatial and Spectral Isolation of Quantum Emitters in Mono- and Bilayer WSe2," Nano Letters, Oct. 19, 2015, vol. 15, pp. 7567-7573.

Branny et al., "Deterministic strain-induced arrays of quantum emitters in a two-dimensional semiconductor," Nature Communications, May 22, 2017, vol. 8, article No. 15053, pp. 1-7.

Kern et al., "Nanoscale Positioning of Single-Photon Emitters in Atomically Thin WSe2," Advanced Materials, 2016, DOI: 10.1002/adma.201600560. pp. 1-5.

* cited by examiner

FIG. 3

(Polarization control)

Narrow gap

Wide gap

1L-WSe₂

(1) Cr mask patterning (2) Dry etching of SiN layer (5) PDMS stamping (6) Monolayer WSe₂ transfer (PL intensity mapping)

(Photon-correlation function)

FIG. 7C

NANOSTRUCTURE CONTROLLING SINGLE PHOTON AND PHOTONIC DEVICE ASSEMBLY COMPRISING THE SAME

CROSS REFERENCE TO RELATED APPLICATION

The present application claims priority to Korean Patent Application No. 10-2021-0083389, filed Jun. 25, 2021, the entire contents of which is incorporated herein for all purposes by this reference.

BACKGROUND OF THE INVENTION

Field of the Invention

The present disclosure relates to a nanostructure controlling a single photon, and a photonic device assembly having the same. In particular, the present disclosure relates to a nanostructure controlling a single photon, the nanostructure being able to control both the position and the polarization direction of a single photon, and a photonic device assembly having the nanostructure.

Description of the Related Art

According to the optical communication technology of the related art, since there are too many photons that are fundamental units for transmitting information in the process of exchanging information between a transmitter and a receiver, even if a wiretapper intercepts information, the transmitter and the receiver cannot sense this fact, so there is a problem that the optical communication technology is very vulnerable in security. In order to solve this problem, a communication technology of using single photons which discharges light particles one by one by reducing the number of photons has been developed, and research for protecting information by immediately sensing an attempt of interception when there is an attempt to intercept information has been started. The single photon is a fundamental element that is the core of a quantum cryptography and quantum information processing technology.

As a plan of a communication technology study using single photons, cases where a single photon is produced due to a natural atomic defect of a 2D material have been reported in many documents. However, 2D materials have an advantage that photoluminescence efficiency is high and they are favorable to couple to an external structure, but have a problem that it is very difficult to control the position and the polarization direction of a single photon. In order to solve this problem, research of controlling the position of a single photon by making a defect of a 2D material by applying artificial deformation to the 2D material to control the position of a single photon has been conducted.

For example, non-patent document 1 (S. Kumar et al., *Nano Lett.*, 15, 7567-7573) simply proposes that a deformation gradient generated by substrate patterning generates a quantum emitter separated in terms of space and spectrum in monolayer and dual-layer $WSe_2$, but does not disclose nor suggest a nanostructure that can control both the position and the polarization direction of a single photon by controlling the distribution of a local strain that is applied to 2D semiconductor materials and does not propose a technical subject that increases emission efficiency of a single-photon emitter by combining the nanostructure with a photonic crystal resonator.

Non-patent document 2 (A. Branny et al., *Nat. Comm.*, 8:15053), has similarly proposed a technical subject that controls the position of a single photon by applying a strain to a 2D semiconductor material, but does not propose a technical subject that can control the polarization direction of a single photon by controlling distribution of a local strain that is applied to 2D semiconductor materials and does not propose a plan for increasing emission efficiency of a single-photon emitter by combining a nanostructure, which can control the position and polarization direction of a single photon, with a photonic crystal resonator.

Non-patent document 3 (J. Kern et al., *Adv. Mater.*, 28, 7101) simply proposes controlling the position of a single photon by disposing monolayer $WSe_2$ in a nanogap defined between gold nanorods, but does not propose nor suggest a nanostructure that can control both the position and the polarization direction of a single photon by controlling distribution of a local strain that is applied to 2D semiconductor materials and does not propose a plan for increasing emission efficiency of a single-photon emitter by combining the nanostructure with a photonic crystal resonator.

That is, the non-patent documents 1, 2, and 3 all have a problem that they have not been progressed to the level that can control the polarization direction of a single photon. The inventor has invented first in the world a nanostructure that can control both the position and the polarization direction of a single photon and has expand the range of the disclosure up to a photonic device assembly that can amplify light of a single photon by disposing a photonic crystal resonator on the nanostructure.

DOCUMENTS OF RELATED ART (Non-patent document 1) S. Kumar et al., Nano Lett., 15, 7567-7573 (2015.10.19.)

(Non-patent document 2) A. Branny et al., Nat. Comm., 8:15053 (2017.05.22.)

(Non-patent document 3) J. Kern et al., Adv. Mater., 28, 7101 (2016.06.15.)

SUMMARY OF THE INVENTION

An objective of the present disclosure is to provide a nanostructure controlling a single photon, the nanostructure being able to apply a strain to transition metal dichalcogenide and being able to control both the position and the polarization direction of a single photon by forming a first nanogap.

Another objective of the present disclosure is to provide a method of manufacturing a nanostructure controlling a single photon, the nanostructure being able to apply a local strain to monolayer transition metal dichalcogenide, using a stamping method beyond the transcription method based on a solution in the related art when transcribing monolayer transition metal dichalcogenide on a nanostructure.

Another objective of the present disclosure is to provide a photonic device assembly that can increase emission efficiency of a single-photon emitter by amplifying light of a specific wavelength while maintaining the characteristics of a single photon by combining the nanostructure, which controls a single photon, on a photonic crystal resonator.

The objectives of the present disclosure are not limited to those described above and other objectives and advantages not stated herein may be understood through the following description and may be clear by embodiments of the present disclosure. Further, it would be easily known that the objectives and advantages of the present disclosure may be achieved by the configurations described in claims and combinations thereof.

An embodiment of the present disclosure for achieving the objectives is a nanostructure controlling a single photon which includes a substrate and at least one insulating film units having a first insulating film and a second insulating film spaced apart from each other on the substrate and in which the portion between the first insulating film and the second insulating film is defined as a first nanogap.

Another embodiment of the present disclosure for achieving the objectives is a method of manufacturing a nanostructure controlling a single photon, the method including: forming at least one insulating film unit having a first insulating film and a second insulating film spaced apart from each other on a substrate; and transcribing monolayer transition metal dichalcogenide on the nanostructure using a stamping method, in which a portion between the first insulating film and the second insulating film is defined as a first nanogap.

Another embodiment of the present disclosure for achieving the objectives is a photonic device assembly including: the nanostructure controlling a single photon; and a photonic crystal resonator disposed on the nanostructure controlling a single photon.

According to an embodiment of the present disclosure, it is possible to control the production position of a single photon by applying a local strain to a desired position through a nanostructure controlling a single photon and it is possible to control the polarization direction of light emitted from a single photon which changes in accordance with distribution of local strains that change in accordance with the width of a nanogap. Accordingly, combination with an external light structure such as a photonic crystal resonator, so not only a core means is proposed in development of an integrated photonic device using a single-photon emitter, but also a foundation that can be generally used in the quantum cryptography communication filed is laid.

Detailed effects of the present disclosure in addition to the above effects will be described with the following detailed description for accomplishing the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objectives, features and other advantages of the present invention will be more clearly understood from the following detailed description when taken in conjunction with the accompanying drawings, in which:

FIG. 3 is a schematic diagram showing that a polarization direction of a single photon is adjusted on a monolayer WSe$_2$ in accordance with the width of a first nanogap;

FIG. 7C is a photoluminescence intensity map showing that the polarization direction of a single photon is the vertical direction;

DETAILED DESCRIPTION OF THE INVENTION

Hereafter, each component of the present disclosure will be described in detail so that those skilled in the art can easily accomplish the present disclosure, but it is only an example and the range of the present disclosure is not limited thereto.

An embodiment of the present disclosure is a nanostructure controlling a single photon which includes a substrate and at least one insulating film units having a first insulating film and a second insulating film spaced apart from each other on the substrate and in which the portion between the first insulating film and the second insulating film is defined as a first nanogap.

Hereafter, the configuration of the present disclosure is described in detail with reference to the drawings.

1. Nanostructure 100 Controlling Single Photon and Manufacturing Method Thereof FIG. 1 is a diagram showing a nanostructure controlling a single photon according to an embodiment of the disclosure.

Figure 1:
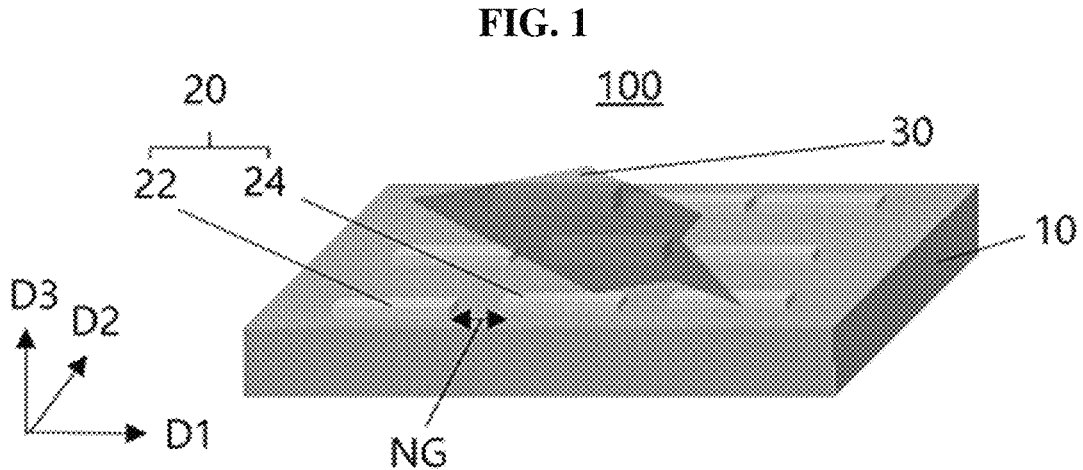
FIG. 1 is a diagram showing a nanostructure controlling a single photon according to an embodiment of the disclosure.

Referring to FIG. 1, the nanostructure 100 controlling a single photon according to the present disclosure may include a substrate 10 and an insulating film unit 20.

In detail, the nanostructure 100 controlling a single photon according to the present disclosure may include at least one or more insulating film units 20 having a first insulating film 22 and a second insulating film 24 spaced apart from each other on the substrate 10. The first insulating film 22 and the second insulating film 24 may be rod structures. The rod structures are defined as rod-shaped nanostructures in the present disclosure.

A first nanogap Ng according to the present disclosure may be defined as a hole or a trench between the first insulating film 22 and the second insulating film 24. In detail, the first nanogap NG may be a trench defined by the first substrate 10, the first insulating film 22, and the second insulating film 24. However, the spirit of the present disclosure is not limited to the shape of the hole or the trench and various shapes may be applied, depending on etching methods.

Monolayer transition metal dichalcogenide 30 according to the present disclosure may be disposed on the nanostructure 100 controlling a single photon.

In detail, the transition metal dichalcogenide may include any one selected from a group of $WSe_2$, $WS_2$, $MoSe_2$, $MoS_2$, $MoTe_2$, and combinations thereof. However, the spirit of the present disclosure is not limited to the kinds of transition metal dichalcogenide and any material may be applied as long as it is a semiconductor material that is a 2D semiconductor material at an atomic level and can produce a single photon when a strain is applied.

In detail, the monolayer transition metal dichalcogenide 30 can cover the first nanogap NG. The monolayer transition metal dichalcogenide 30 can cover a portion of the top of the first insulating film 22, a portion of the top of the second insulating film 24, and the first nanogap NG.

In the present specification, a first direction D1 is defined as a direction in which the first insulating film 22 and the second insulating film 24 are spaced apart from each other, a second direction D2 is defined as a direction crossing the first direction D1, and a third direction D3 is defined as a direction crossing the first direction D1 and the second direction D2. For example, the first to third directions D1, D2, and D3 may be perpendicular to each other and the third direction D2 is defined as the width direction of a film.

The first insulating film 22 and the second insulating film 24 may be spaced apart from each other in the first direction D1. In other words, the first direction D1 may be a direction in which the first insulating film 22 and the second insulating film 24 are elongated.

According to an embodiment of the present disclosure, in the first direction D1, the width of the first nanogap NG may be less than 90 nm (nanometers), preferably less than 10 to 90 nm (nanometers), and more preferably less than 60 to 90 nm (nanometers).

When the width of the first nanogap NG satisfies the range of the values in the first direction D1, a local strain may be applied to the monolayer transition metal dichalcogenide 30 that is a 2D semiconductor material. In detail, at the first nanogap NG, the strain that is applied to the monolayer transition metal dichalcogenide 30 may be 0.20 to 0.40%, preferably 0.22 to 0.36%, and more preferably 0.26 to 0.34%.

Meanwhile, a strain may be 0% when the monolayer transition metal dichalcogenide 30 is disposed on the substrate 10, and when the monolayer transition metal dichalcogenide 30 is disposed on the insulating film unit 20, a strain may be 0.10 to 0.20%, preferably 0.14 to 0.18%, and more preferably 0.16 to 0.17%. That is, the local strain that is applied to the monolayer transition metal dichalcogenide 30 depends on the substrate 10, the insulating film unit 20, and the first nanogap NG, whereby the polarization direction of a photon can be adjusted.

In detail, the polarization direction of a photon according to the present disclosure is the first direction D1, so the photon can be polarized in the first direction when the gap of the first nanogap NG is less than 90 nm (nanometers).

According to another embodiment of the present disclosure, in the first direction D1, the width of the first nanogap NG may be 90 nm (nanometers) or more, preferably 90 to 150 nm (nanometers), and more preferably less than 90 to 130 nm (nanometers). When the width of the first nanogap NG satisfies the range of the values in the first direction D1, a local strain may be applied to the monolayer transition metal dichalcogenide 30 that is a 2D semiconductor material. In detail, at the first nanogap NG, the strain that is applied to the monolayer transition metal dichalcogenide 30 may be 0.20 to 0.40%, preferably 0.22 to 0.34%, and more preferably 0.24 to 0.29%.

When the width of the first nanogap NG is 90 nm (nanometers) or more in the first direction D1, a photon according to the present disclosure can be polarized in the second direction D2 crossing the first direction D1 at the first nanogap NG. For example, the second direction D2 may be a direction perpendicular to the first direction D1.

The substrate 10 according to the present disclosure may be any one selected from a group of silicon, a SOI (silicon on insulator), a $SiO_2$/Si substrate, silicon germanium, an indium antimonide, a lead-telluride compound, an indium arsenide, an indium phosphide, a gallium arsenide, a gallium antimonide, and combinations thereof.

The thickness of the substrate 10 according to the present disclosure may be 0.5 to 1.5 mm (micrometer) and preferably 1.0 to 1.5 mm (micrometers). However, the spirit of the present disclosure is not limited to the range of the thickness of the substrate and various thicknesses may be applied to the substrate.

The insulating film unit 20 according to the present disclosure may be a silicon nitride film or a silicon oxynitride film. In detail, the first insulating film 22 and the second insulating film 24 may be a silicon nitride film or a silicon oxynitride film.

The thickness of the first insulating film 22 according to the present disclosure may be 100 to 200 nm (nanometers), preferably 130 to 170 nm (nanometers), and more preferably 140 to 160 nm (nanometers).

The thickness of the second insulating film 24 according to the present disclosure may be 100 to 200 nm (nanometers), preferably 130 to 170 nm (nanometers), and more preferably 140 to 160 nm (nanometers). The thickness of the second insulating film 24 may be the same as or different from the thickness of the first insulating film 22. However, for the manufacturing process of the nanostructure controlling a single photon according to the present disclosure, it is preferable that the thickness of the first insulating film 22 and the thickness of the second insulating film 24 are the same.

According to an embodiment, the first insulating film 22 and the second insulating film 24 may be the same or different in configuration, but for the manufacturing process of the nanostructure controlling a single photon according to the present disclosure, it is preferable that the first insulating film 22 and the second insulating film 24 are the same in configuration.

Figure 2:
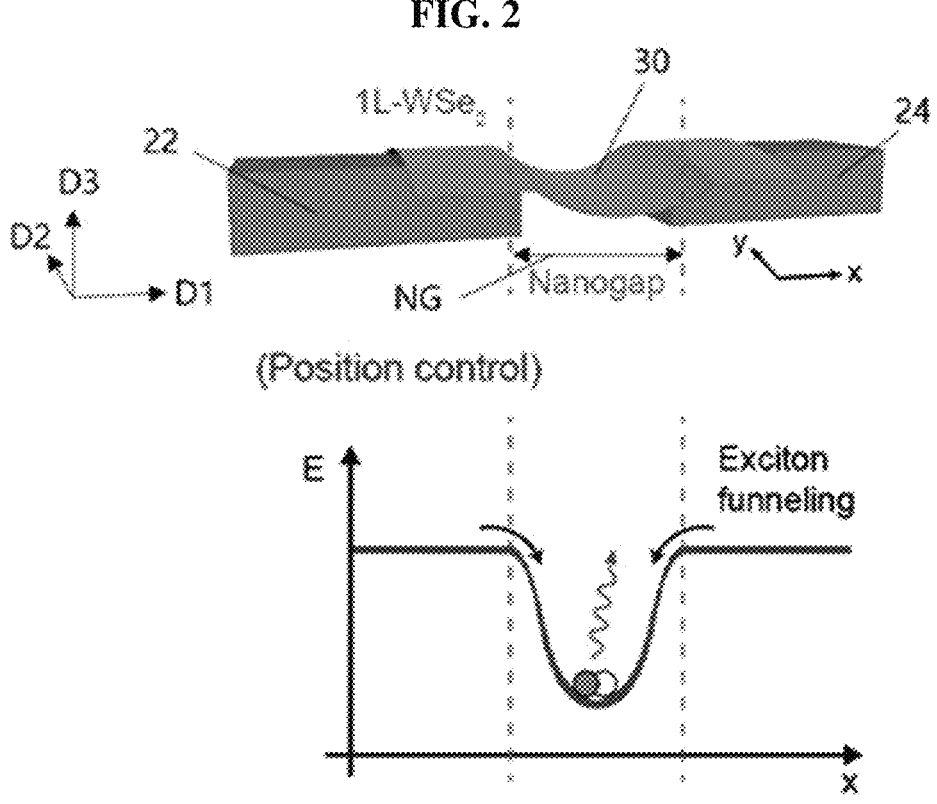
FIG. 2 is a schematic diagram showing that the position of a single photon is adjusted by a strain applied to monolayer WSe$_2$ by a first nanogap.

FIG. 2 is a schematic diagram showing that the position of a single photon is adjusted by a strain applied to monolayer WSe$_2$ by a first nanogap. Repeated configuration with the above description is briefly described or not described.

Referring to FIG. 2, when a strain is locally applied to the monolayer transition metal dichalcogenide 30, a single photon can be produced at a desired position by a strong quantum confinement effect. In detail, when the radius of a particle is smaller than a bore radius in a semiconductor nanocrystal, an electron excited by external energy makes weak bonding with a hole, and such a bonding state of an electron and a hole is called an exciton. Therefore, according to the present disclosure, it is possible to produce a single photon at a desired position through the monolayer transition metal dichalcogenide 30.

Figure 3:
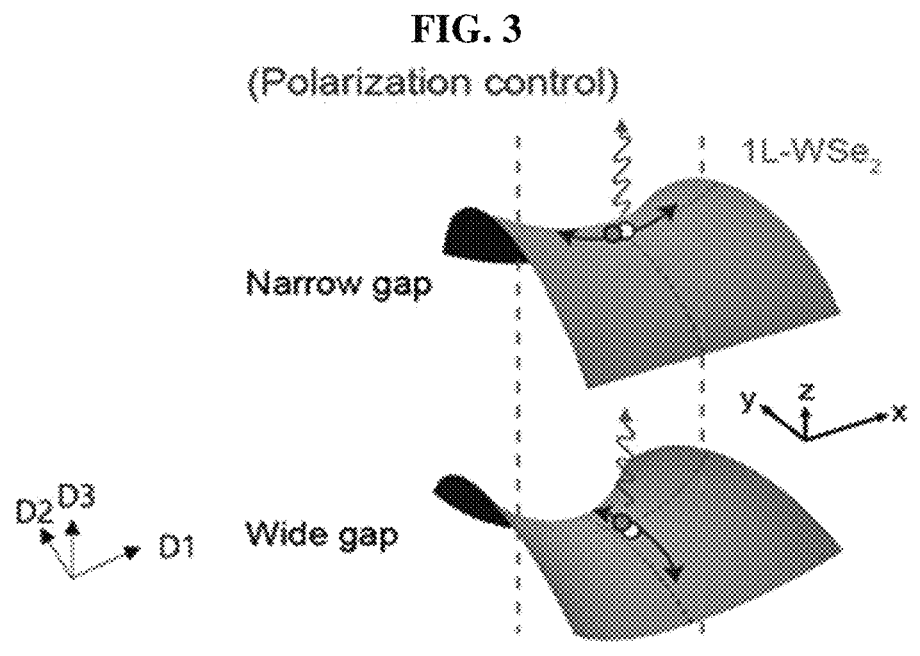

FIG. 3 is a schematic diagram showing that a polarization direction of a single photon is adjusted on a single-layer WSe$_2$ in accordance with the width of a first nanogap.

Referring to FIG. 3, when the first nanogap NG is narrow, a single photon may be polarized in the first direction D1, and when the first nanogap NG is relatively wide, the polarization direction of a single photon may be the second direction D2 crossing the first direction D1. For example, the second direction D2 is perpendicular to the first direction D1.

Figure 4A:
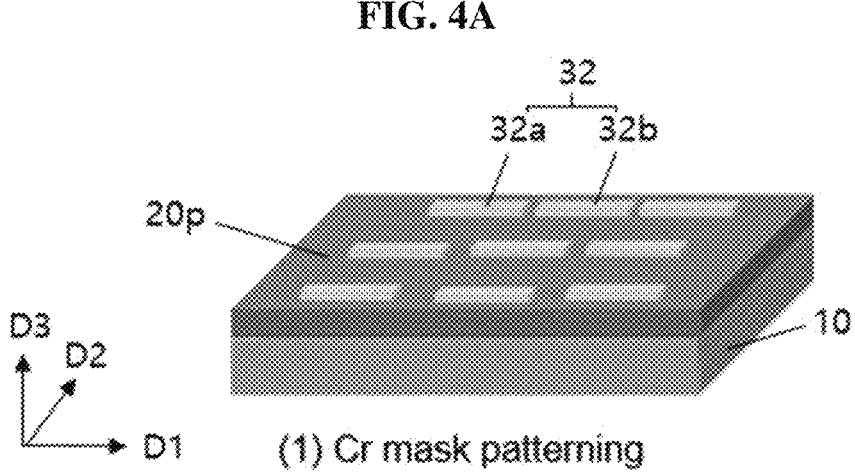
FIG. 4A is a diagram showing a step of a method of manufacturing a nanostructure according to an embodiment of the present disclosure.
Figure 4B:
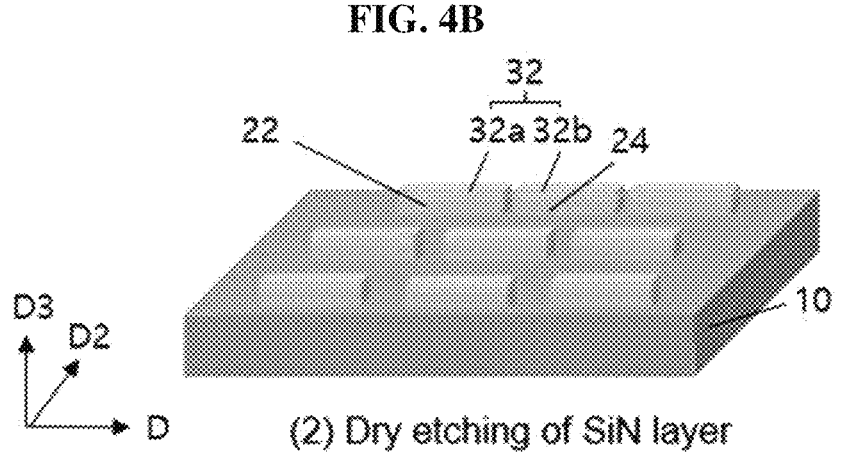
FIG. 4B is a diagram showing a step of the method of manufacturing a nanostructure according to an embodiment of the present disclosure.
Figure 4C:
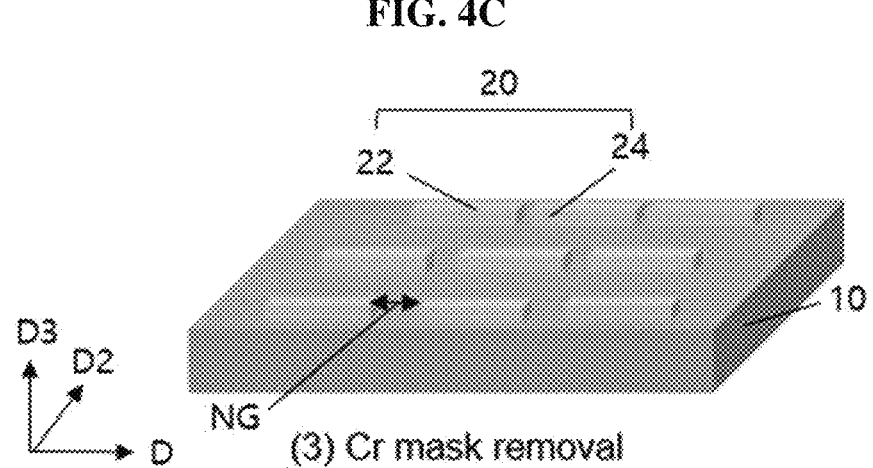
FIG. 4C is a diagram showing a step of the method of manufacturing a nanostructure according to an embodiment of the present disclosure.
Figure 4D:
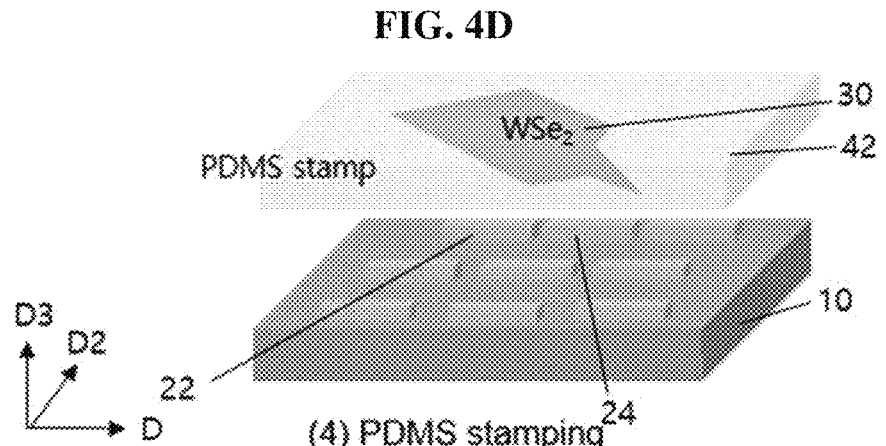
FIG. 4D is a diagram showing a step of the method of manufacturing a nanostructure according to an embodiment of the present disclosure.
Figure 4E:
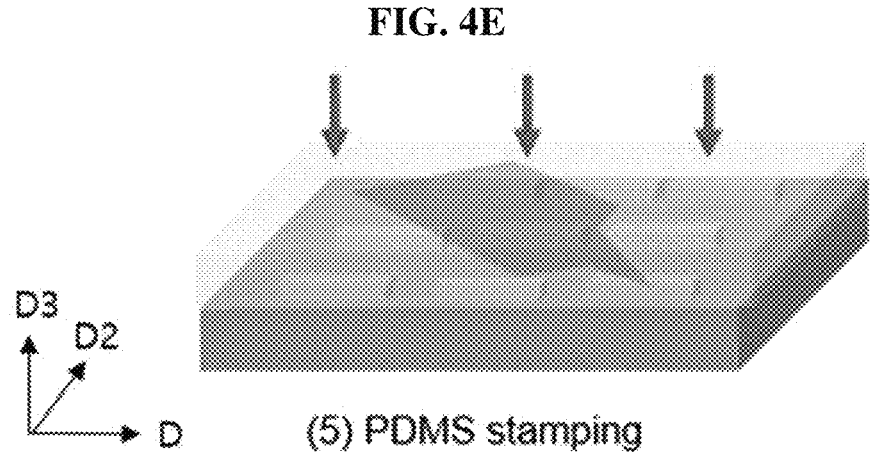
FIG. 4E is a diagram showing a step of the method of manufacturing a nanostructure according to an embodiment of the present disclosure.

FIG. 4A is a view showing a step of a method of manufacturing a nanostructure according to an embodiment of the present disclosure. FIG. 4B is a diagram showing a step of the method of manufacturing a nanostructure according to an embodiment of the present disclosure. FIG. 4C is a diagram showing a step of the method of manufacturing a nanostructure according to an embodiment of the present disclosure. FIG. 4D is a diagram showing a step of the method of manufacturing a nanostructure according to an embodiment of the present disclosure. FIG. 4E is a diagram showing a step of the method of manufacturing a nanostructure according to an embodiment of the present disclosure.

Figure 4F:
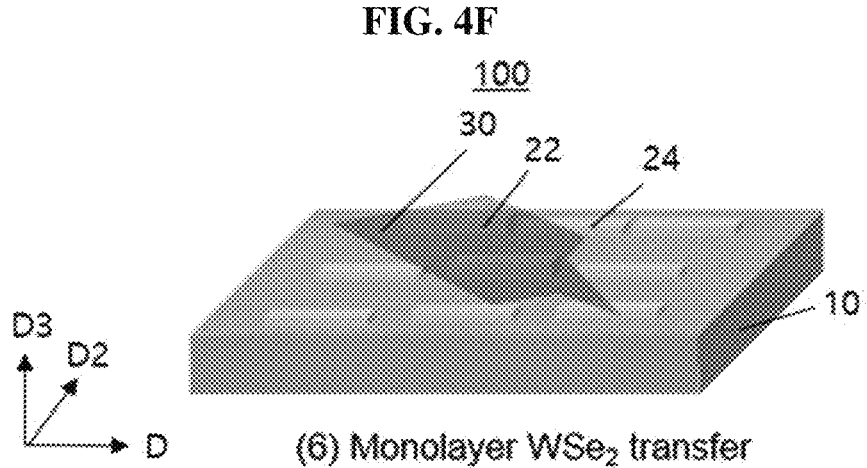
FIG. 4F is a diagram showing a step of the method of manufacturing a nanostructure according to an embodiment of the present disclosure.

FIG. 4F is a diagram showing a step of the method of manufacturing a nanostructure according to an embodiment of the present disclosure.

Referring to FIGS. 4A to 4F, another embodiment of the present disclosure is a method of manufacturing a nanostructure controlling a single photon. The method includes: forming at least one or more insulating film units 20 having a first insulating film 22 and a second insulating film 24 spaced apart from each other on a substrate 10; and transcribing monolayer transition metal dichalcogenide 30 on the substrate controlling a single photon through a stamping method, in which the portion between the first insulating film and the second insulating film is defined as a first nanogap NG.

The stamping method may be a method of performing transcription on a polydimethylsiloxane stamp. The polydimethylsiloxane stamp may be completely dried. When monolayer transition metal dichalcogenide is transcribed by a transcription method based on a solution in the related art, there is a problem that a single photon is not detected. This is because a strain is not applied to the monolayer transition metal dichalcogenide. Therefore, according to the present disclosure, a single photon could be found by applying a strain to monolayer transition metal dichalcogenide covering a first nanogap by using the stamping method described above. That is, a strain can be applied to the monolayer transition metal dichalcogenide at the first nanogap by the stamping method.

Referring to FIGS. 4A to 4F, in more detail, the method of manufacturing a nanostructure controlling a single photon according to another embodiment of the present disclosure includes forming a pre-insulating film 20p on a substrate 10 (S1); forming at least one anti-etching film unit 32 having a first anti-etching film 32a and a second anti-etching film 32b spaced apart from each other on the pre-insulating film 20 (S2); etching the pre-insulating film 20p using the anti-etching film unit 32 (S3); and removing the anti-etching film unit 32 (S4). Repeated configuration with the above description is briefly described or not described.

The pre-insulating film unit 20p according to the present disclosure may be a silicon nitride film or a silicon oxynitride film. In detail, the insulating film unit 20 may be a film coming from the pre-insulating film unit 20p and patterned by the anti-etching film unit 32.

In step S1, as a method of forming the pre-insulating film unit 20p, any one method selected from a group of physical vapor deposition, chemical vapor deposition, and atomic layer deposition may be used, and low pressure chemical vapor deposition may be used.

Step S2 may be a step of forming the first anti-etching film 32a and the second anti-etching film 32b spaced apart from each other in the first direction D1 by forming the anti-etching film unit 32 on the pre-insulating film 20p.

The anti-etching film unit 32 has a low etch rate in comparison to the pre-insulating film 20p, so it is possible to selectively etch the pre-insulating film 20p using the anti-etching film unit 32 as a mask. The anti-etching film unit 32, for example, may be a Cr mask. However, the spirit of the present disclosure is not limited thereto and a material having a lower etch rate than that of the pre-insulating film may be applied to the anti-etching film unit.

The thickness of the anti-etching film unit 32 according to the present disclosure may be 10 to 30 nm (nanometers) and preferably 20 to 30 nm (nanometers).

Though not shown in detail in FIGS. 4A to 4F, step S3 may be a step of selectively patterning the pre-insulating film 20p by forming a photoresist film on the anti-etching film unit 32, by exposing the photoresist film using electron beam lithography, and then by developing the exposed portion.

Step S4 may be a step of removing the anti-etching film unit 32 using a reagent. The reagent may be a Cr-etching reagent (Cr etchant).

As described above, the method of manufacturing a nanostructure controlling a single photon according to the present disclosure may further include a step of transcribing the monolayer transition metal dichalcogenide 30 on the nanostructure with the anti-etching film unit 32 removed using a stamp 42 (S5).

2. Photonic Device Assembly 200

Another embodiment of the present disclosure is a photonic device assembly 200 including the nanostructure 100 controlling a single photon.

Figure 5:
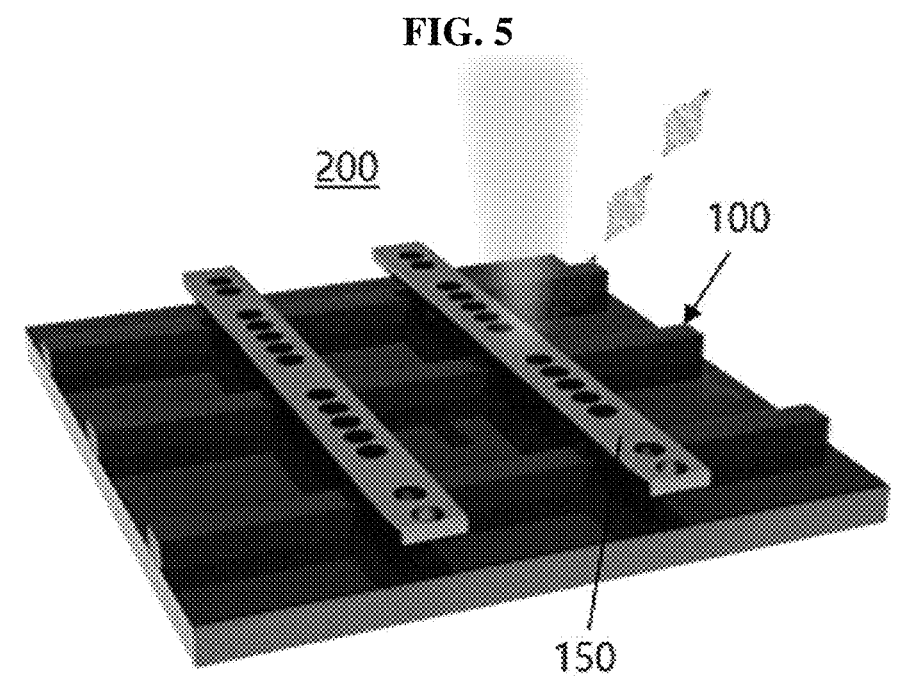
FIG. 5 is a diagram showing a photonic device assembly according to an embodiment of the present disclosure.

FIG. 5 is a diagram showing a photonic device assembly according to an embodiment of the present disclosure.

Referring to FIG. 5, the photonic device assembly 200 according to the present disclosure includes the nanostructure 100 controlling a single photon and a photonic crystal resonator 150 disposed on the nanostructure 100 controlling a single photon. Since the position and the polarization direction of a single photon are both controlled by the nanostructure controlling a single photon according to the present disclosure, it is possible to amplify light of a specific wavelength from a single-photon emitter using the photonic crystal resonator while keeping the characteristic of emitting a single photon.

Meanwhile, in order to the efficiency of combination with a photonic crystal resonator that can increase the emission efficiency of a single-photon emitter, it is necessary to maximally coincide with the relative position and the polarization direction between the single-photon emitter and the resonator. According to the present disclosure, since the portion and the polarization direction of a single-photon emitter are both controlled, there is an advantage that it is possible to maximize the emission efficiency of the single-photon emitter.

Further, since the monolayer transition metal dichalcogenide according to the present disclosure is made of a 2D material and is thin, there is an advantage that combination with the photonic crystal resonator is easy. Therefore, according to the present disclosure, it is possible to implement a photonic device that can be generally used in the quantum cryptography communication field.

Hereafter, embodiments of the present disclosure will be described in detail so that those skilled in the art can easily accomplish the present disclosure, but they are only examples and the range of the present disclosure is not limited thereto.

Manufacturing Example 1: Manufacturing of Nanostructure Controlling Single Photon A pre-insulating film ($Si_3N_4$) having a thickness of 150 nm (nanometers) was formed on an $SiO_2$/Si substrate wafer having a thickness of 1 μm (micrometers). A Cr mask having a thickness of 20 nm (nanometers) was formed on the pre-insulating film through electron beam lithography, E-beam evaporation, and lift-off. The pre-insulating film was etched through reactive ion etching using the Cr mask. Thereafter, the Cr mask was removed using a chromium-etching reagent (Sigma Aldrich). A nanostructure controlling a single photon was manufactured by transcribing mono-layer $WSe_2$ on the resultant with the Cr mask removed using a PDMS (GelPak) stamping method. The nanostructure controlling a single photon includes at least one nanogap between etched pre-insulating films spaced apart from each other.

Figure 6A:
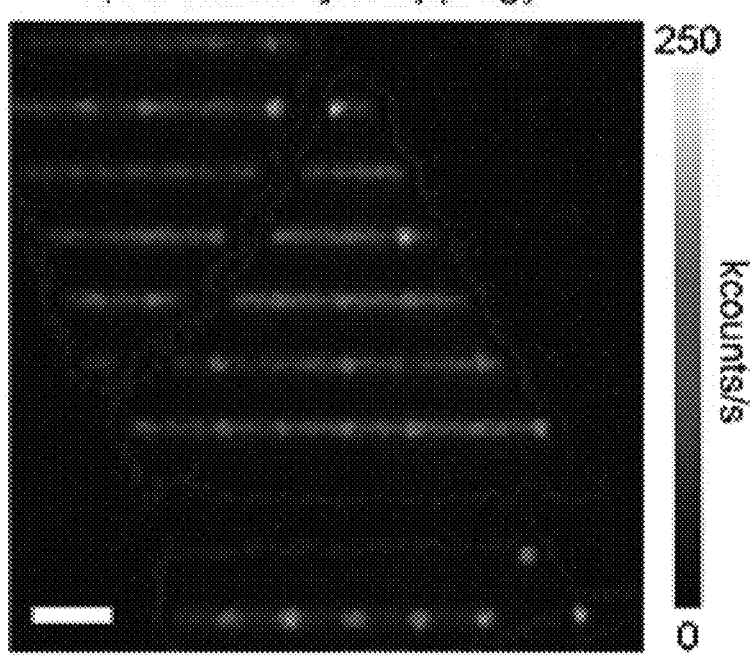
FIG. 6A shows mapping of photoluminescence intensity at a first nanogap observed as a light point through a confocal microscopy.

Experimental Example 1: Experiment of Checking Position Control of Single-Photon Emitter at First Nanogap FIG. 6A shows mapping of photoluminescence intensity at a first nanogap observed as a light point through a confocal microscopy. Referring to FIG. 6A, it can be seen that points where intensive photoluminescence is generated due to exciton deflecting at the first nanogap.

Figure 6B:
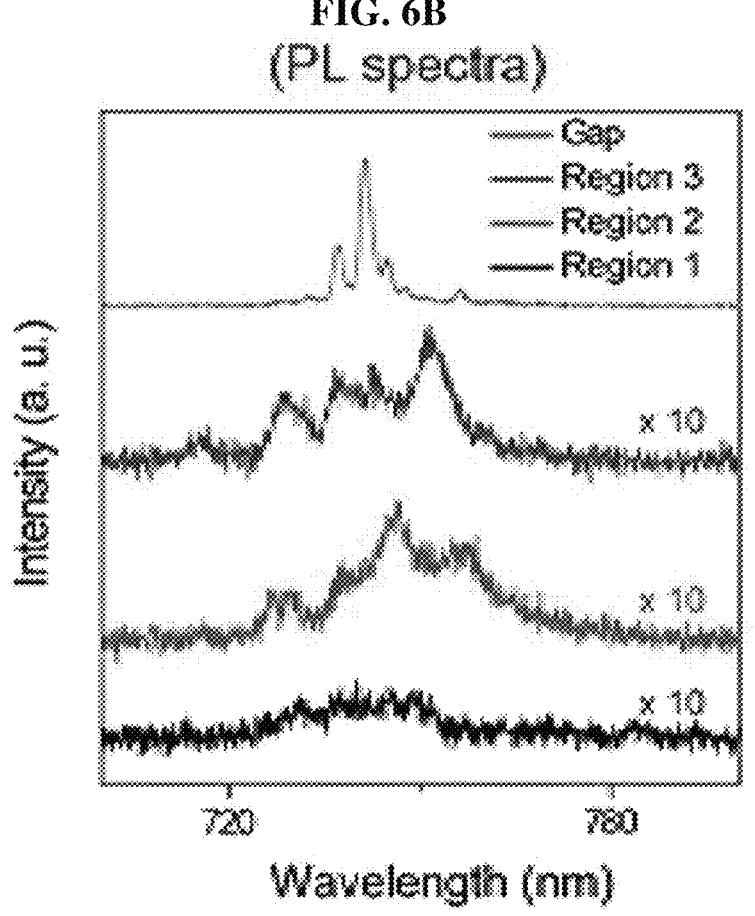
FIG. 6B is a diagram verifying that a strong exciton peak is generated only at a first nanogap.

FIG. 6B is a diagram verifying that a strong exciton peak is generated only at a first nanogap. Photoluminescence intensity according to a wavelength was measured on light, which is emitted when energy is excited using a 532 nm continuous-wave laser having power of 2.3 mW, using an object lens of 100 magnifications, a grating, and a charge-coupled device (CCD).

Referring to FIG. 6B, it can be seen that an intense exciton peak is shown only at the first nanogap rather than other areas of the nanostructure controlling a single photon, and in detail, it can be seen the light sources show a spectrum having a narrow linewidth under 1 nm at a wavelength of 742 nm.

Unlike at the first nanogap, a first region Region 1 means a substrate, a second region Region 2 means a rod structure, and a third region Region 3 also means a rod structure.

Figure 6C:
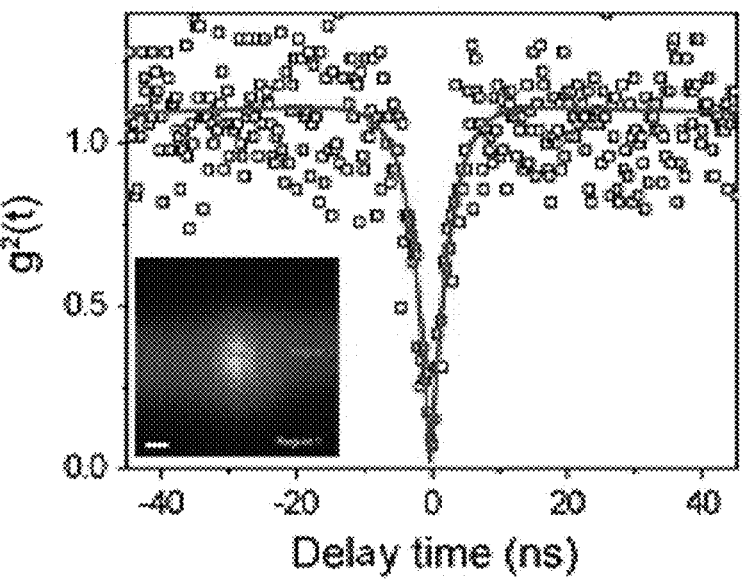
FIG. 6C shows the result of measuring a photon-correlation function that confirms a single-photon emitter.

FIG. 6C shows the result of measuring a photon-correlation function that confirms a single-photon emitter.

Referring to FIG. 6C, it can be seen that, as the result of measuring a photon-correlation function, when a delay time 0, $g^2(0)$ is less than 0.1 and the monolayer transition metal dichalcogenide disposed at the first nanogap becomes a single-photon emitter.

Experimental Example 2: Experiment of Checking Polarization of Single Photon

FIGS. 7A to 7D are diagram showing that the polarization of a single photon changes in accordance with the width of the first nanogap. A photoluminescence (PL) intensity map was measured using a confocal microscopy.

Figure 7A:
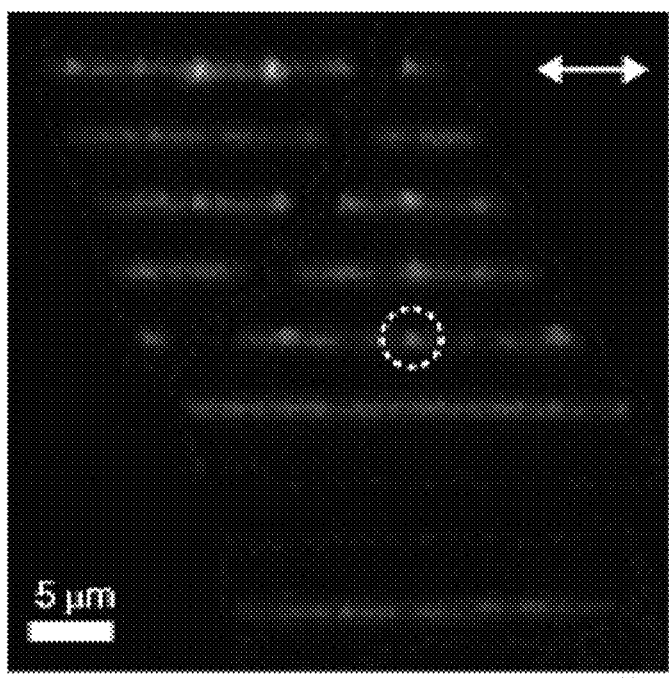
FIG. 7A is a photoluminescence intensity map showing that the polarization direction of a single photon is the horizontal direction.
Figure 7B:
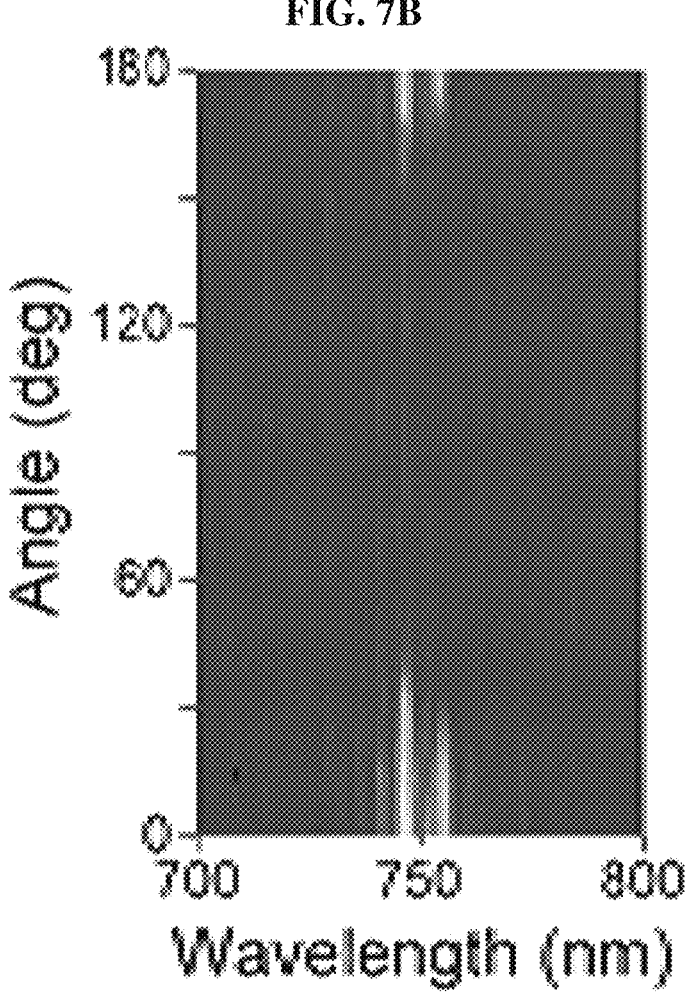
FIG. 7B is a diagram showing a photoluminescence spectrum according to the angle of a polarizer on the basis of a single photon emitter in the area indicated by a white dotted-line circle of FIG. 7A.

FIG. 7A is a PL intensity map showing that the polarization direction of a single photon is the horizontal direction. FIG. 7B is a diagram showing a photoluminescence spectrum according to the angle of a polarizer on the basis of a single photon emitter in the area indicated by a white dotted-line circle of FIG. 7B. A linear polarizer is put in front of a charge-coupled device (CCD) and measurement is performed while the linear polarizer is turned.

Referring to FIGS. 7A and 7B, it can be seen that when the size of the width of the first nanogap in the first direction is relatively small as 70 nm, the polarization direction of a single photon is controlled to the first direction. In detail, it is possible to experimentally know that the polarization direction of a single photon generated by passing a single photon, which is emitted from the first nanogap, through the linear polarizer is controlled in accordance with the size of the width of the first nanogap.

Figure 7C:
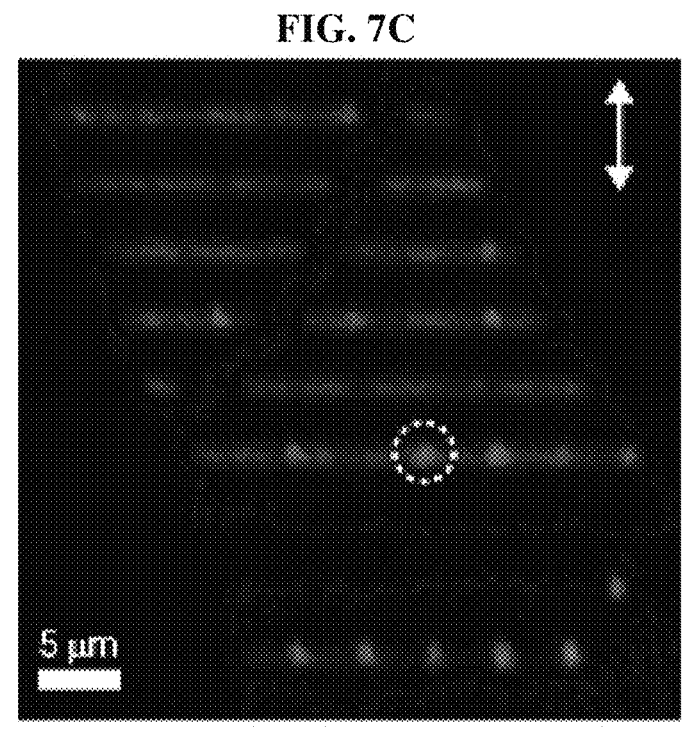
Figure 7D:
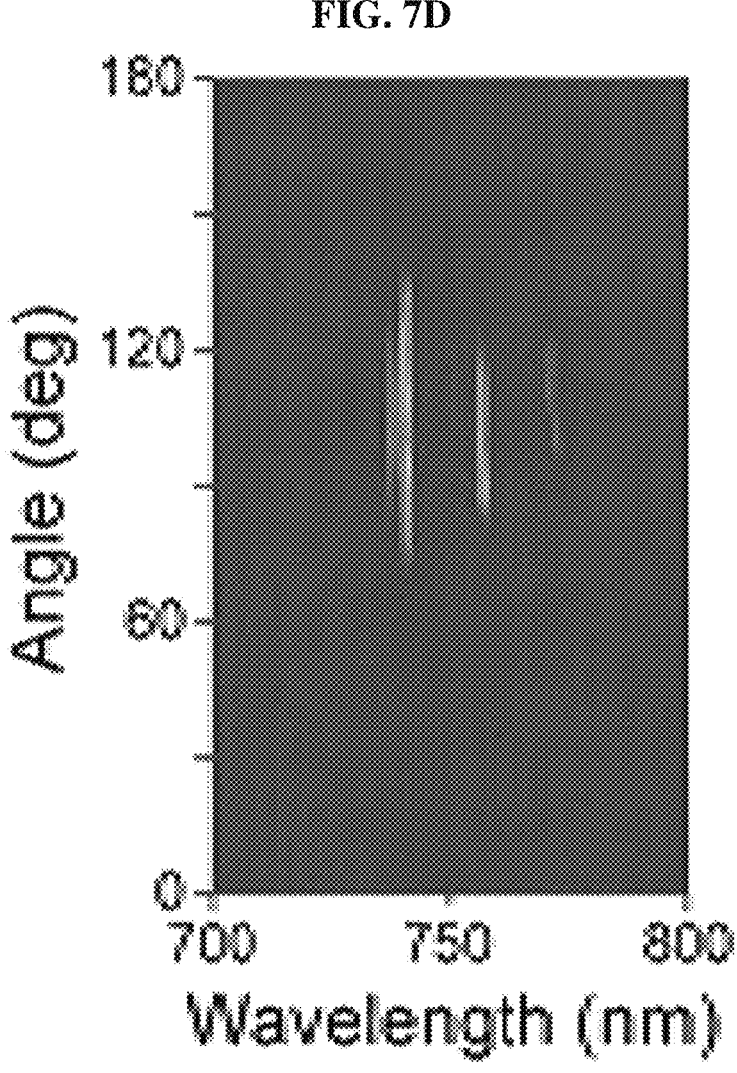
FIG. 7D is a diagram showing a photoluminescence spectrum according to the angle of a polarizer on the basis of a single photon emitter in the area indicated by a white dotted-line circle of FIG. 7C.

FIG. 7C a photoluminescence intensity map showing that the polarization direction of a single photon is the vertical direction. FIG. 7D is a diagram showing a photoluminescence spectrum according to the angle of a polarizer on the basis of a single photon emitter in the area indicated by a white dotted-line circle of FIG. 7C.

Referring to FIGS. 7C and 7D, it can be seen that when the size of the width of the first nanogap in the first direction is 110 nm, that is, relatively large, the polarization direction of a single photon is controlled to the second direction perpendicular to the first direction. In detail, it is possible to experimentally know that the polarization direction of a single photon generated by passing a single photon, which is emitted from the first nanogap, through the linear polarizer is controlled in accordance with the size of the width of the first nanogap.

Figure 8A:
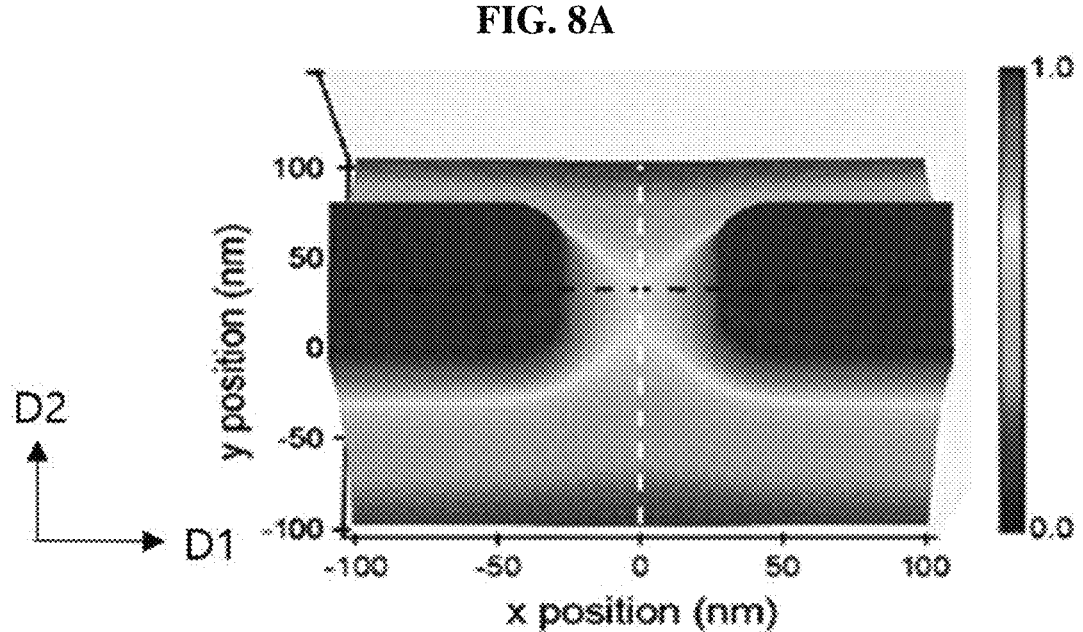
FIG. 8A shows a nanostructure according to an embodiment of the present disclosure through a simulation using a finite-element method.
Figure 8B:
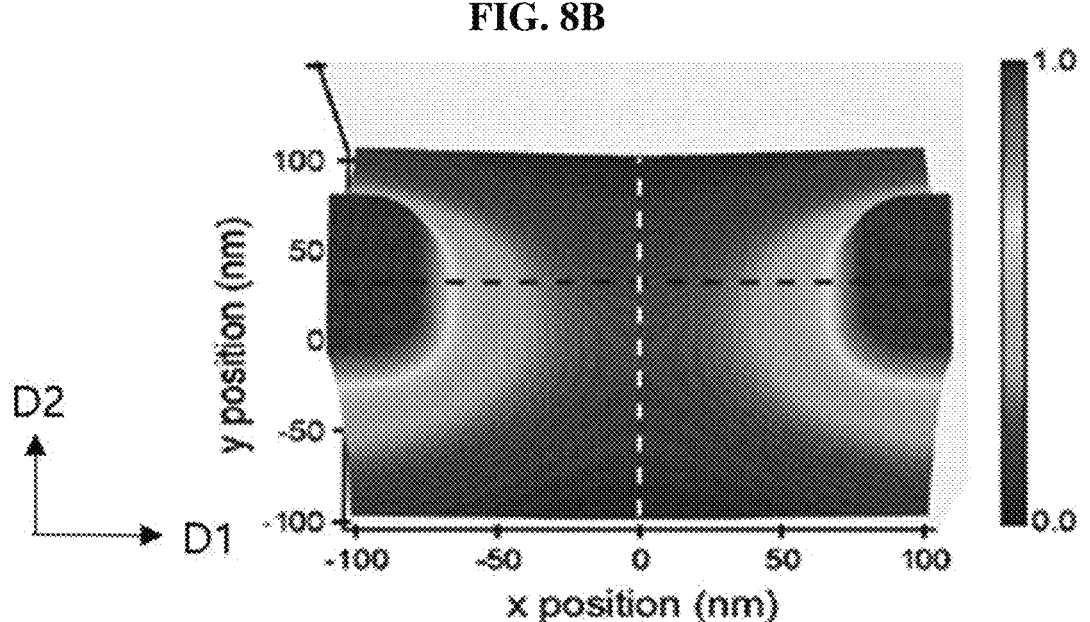
FIG. 8B shows a nanostructure according to an embodiment of the present disclosure through a simulation using a finite-element method.

Experimental Example 3: Experiment of Verifying Effect by Stamping Transcription Method FIGS. 8A to 8D show the shape of pressed PDMS through a simulation using a finite-element method. In detail, FIG. 8A shows a nanostructure according to an embodiment of the present disclosure through a simulation using a finite-element method. FIG. 8B shows a nanostructure according to an embodiment of the present disclosure through a simulation using a finite-element method.

Figure 8C:
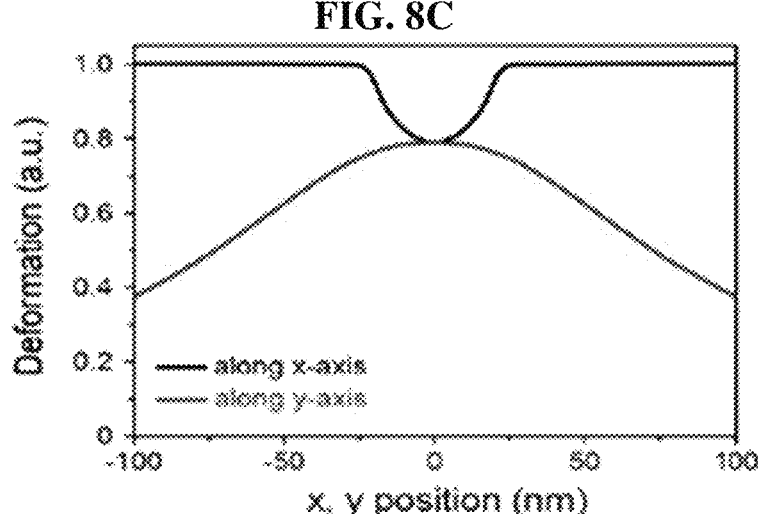
FIG. 8C shows the result of measuring deformation along an x-axis (black-line; concave up) and a y-axis (red-line; concave down) of FIG. 8A.
Figure 8D:
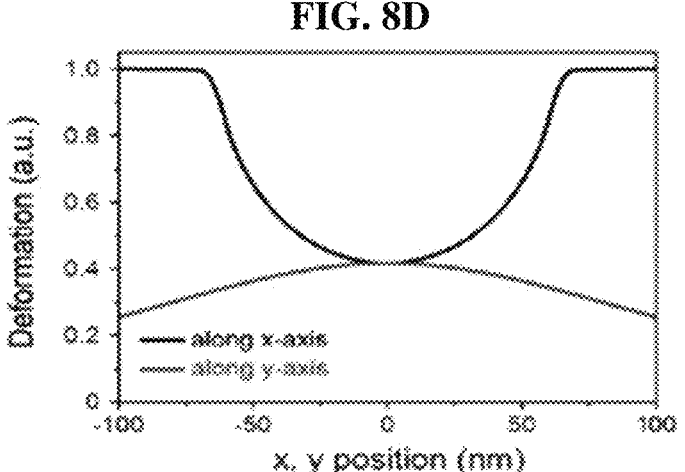
FIG. 8D shows the result of measuring deformation along an x-axis (black-line; concave up) and a y-axis (red-line; concave down) of FIG. 8B.

FIG. 8A shows a case in which the width of the first nanogap is 60 nm, that is, small in the first direction D1 and is 100 nm in the direction perpendicular to the first direction in the nanostructure according to the manufacturing example 1, and FIG. 8B shows a case in which the width of the first nanogap is 140 nm in the first direction and is 100 nm in the direction perpendicular to the first direction. FIG. 8C is the result of measuring deformation along an x-axis (black-line; concave up) and a y-axis (red-line; concave down) of FIG. 8A. FIG. 8D shows the result of measuring deformation along an x-axis (black-line; concave up) and a y-axis (red-line; concave down) of FIG. 8B.

Referring to FIGS. 8A and 8C, it can be seen that the width of the first nanogap in the first direction D1 is 60 nm, that is, relatively small, deformation of the PDMS is larger in the y-axis than the x-axis.

Referring to FIGS. 8B and 8D, it can be seen that the width of the first nanogap in the first direction D1 is 140 nm, that is, relatively large, deformation of the PDMS is larger in the x-axis than the y-axis.

Consequently, considering that the shape of monolayer WSe$_2$ follows the shape of PDMS after the PDMS is transcribed, monolayer WSe$_2$ to which an anisotropic strain is applied considerably depends on the size of the width (in the first direction) of the first nanogap, so it is possible to control the position of an exciton and control two different polarization of a single photon.

Manufacturing Example 2: Manufacturing of Photonic Device Assembly

A nanostructure was manufactured in the same was as the manufacturing example 1, in which a pre-insulating film (Si$_3$N$_4$) having a thickness of 200 nm was manufactured on an SiO$_2$/Si substrate wafer having a thickness of 1 μm using electron beam lithography and reactive ion etching. However, a 3-cell photonic crystal nanobeam cavity is defined such that the lattice constant is 280 nm, the diameter of regularly distributed holes is 195 nm, and the diameter of reduced holes is 95 nm, and the thickness and the width of a nanobeam structure are defined as 200 nm and 420 nm, respectively. A sacrifice film SiO$_2$ under the Si$_3$N$_4$ layer was selectively etched using a buffered oxide etchant. Thereafter, a free-standing Si$_3$N$_4$ photonic crystal slave was transcribed on monolayer WSe$_2$, to which a strain was applied, by a transcription method that uses a PDMS tip, whereby a photonic device assembly was manufactured.

Experimental Example 4: Array of Cavities in Photonic Device Assembly

Figure 9A:
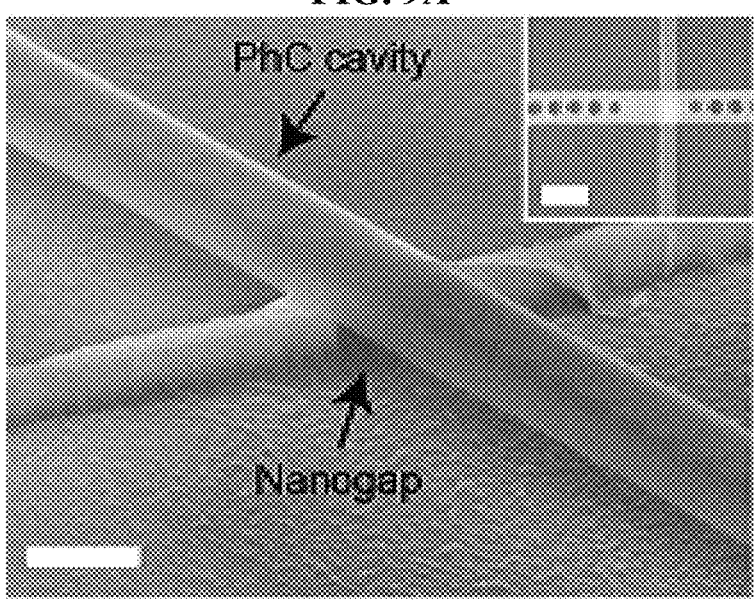
FIG. 9A is an SEM picture showing an array of 1D photonic crystal nanobeam cavity having a resonance frequency close to that of a single-photon emitter in a photonic device assembly.
Figure 9B:
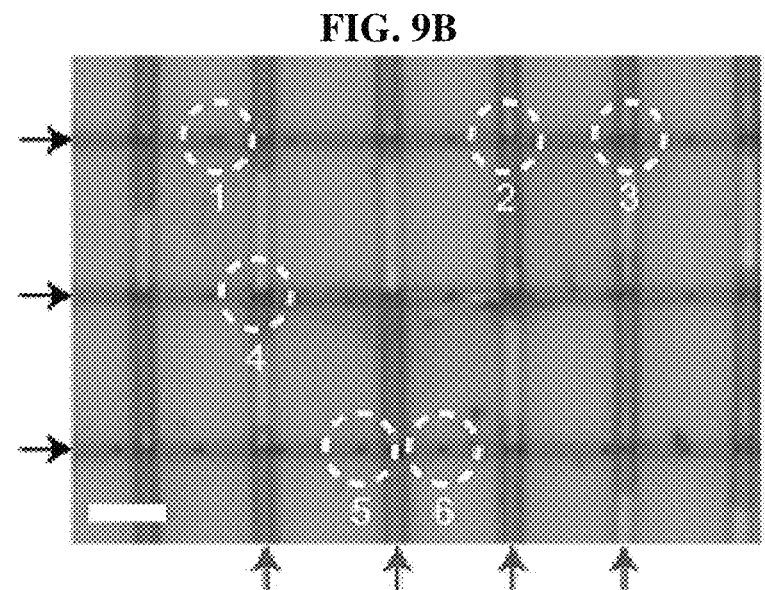
FIG. 9B is an optical microscopic picture showing that a 1D photonic crystal nanobeam cavity has been transcribed on a nanostructure according to the manufacturing example.
Figure 9C:
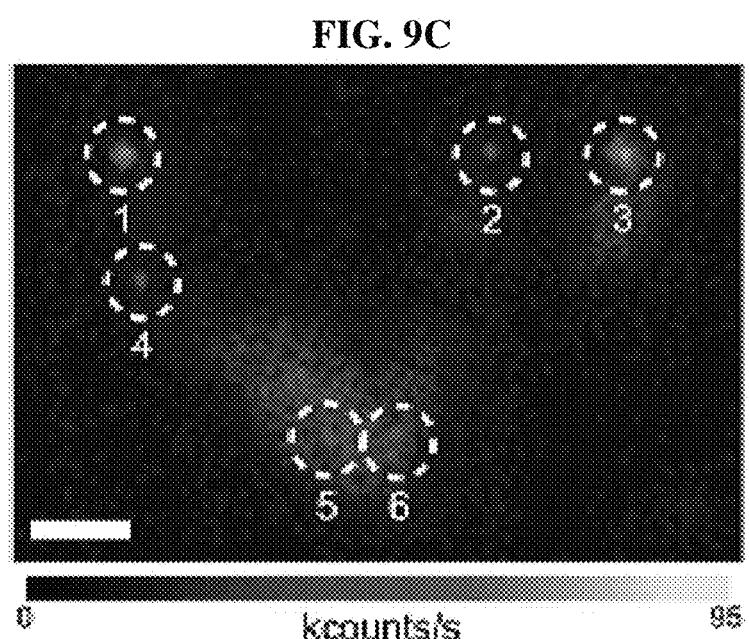
FIG. 9C shows a high-resolution raster scanning PL image measured under the condition that pump power is 1.12 μW and a scale bar is 3 μm.

FIGS. 9A to 9C are diagrams showing an array of cavities in a photonic device assembly according to an embodiment of the present disclosure.

FIG. 9A is an SEM picture showing an array of 1D photonic crystal nanobeam cavity having a resonance frequency close to that of a single-photon emitter in a photonic device assembly.

Referring to FIG. 9A, it can be seen that a photonic crystal cavity was transcribed on a first nanogap and is composed of three missing air holes in a 1D nanobeam.

FIG. 9B is an optical microscopic picture showing that a 1D photonic crystal nanobeam cavity has been transcribed on the nanostructure according to the manufacturing example.

Referring to FIG. 9B, it can be seen that the black arrows and the red arrows indicate rod structures and photonic crystal structures made of Si$_3$N$_4$, respectively, in the photonic device assembly.

FIG. 9C shows a high-resolution raster scanning PL image measured under the condition that pump power is 1.12 μW and a scale bar is 3 μm.

Referring to FIGS. 9B and 9C, it can be seen that the single-photon emitter 3 coupled with a photonic crystal cavity shows higher emission intensity than the single-photon emitter 1 not coupled with a photonic crystal cavity, which is inferred as being caused by a pressure difference in a transcription process using a PDMS stamp.

Experimental Example 5: Experiment of Characteristics of Photonic Device Assembly FIGS. 10A to 10D show experiments for proving the characteristics of a photonic device assembly according to an embodiment of the present disclosure.

Figure 10A:
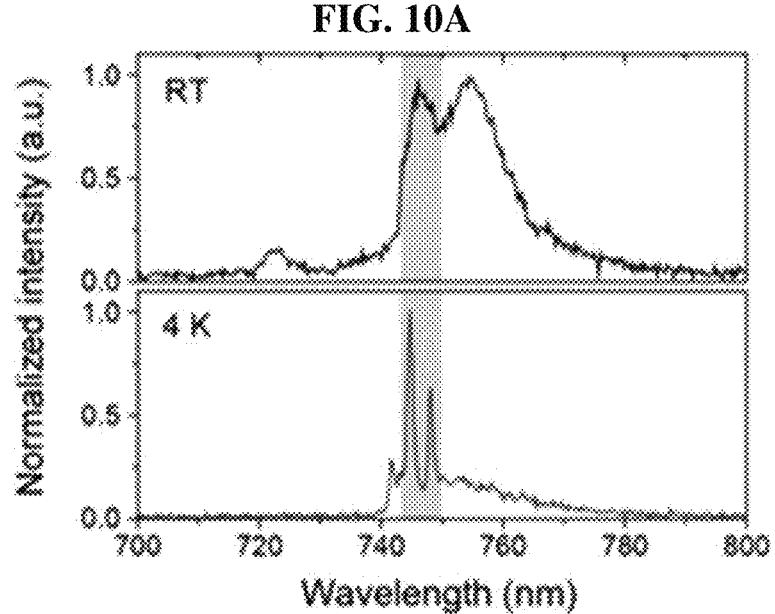
FIG. 10A shows spectrums of photoluminescence intensity measured at a room temperature (RT) and 4K in a single-photon emitter (No. 3) of FIG. 9B.

FIG. 10A shows spectrums of photoluminescence intensity measured at a room temperature (RT) and 4K in a single-photon emitter (No. 3) of FIG. 9B.

Referring to FIG. 10A, it can be seen that the single-photon emitter (No. 3) is matched well with a photonic crystal cavity mode by comparing the photoluminescence spectrums measured at room temperature and 4K at the single-photon emitter (No. 3). In particular, it can be seen that the intensity of a single photon emitted at wavelengths of 740 nm to 750 nm is amplified through the photonic device assembly according to the present disclosure.

Figure 10B:
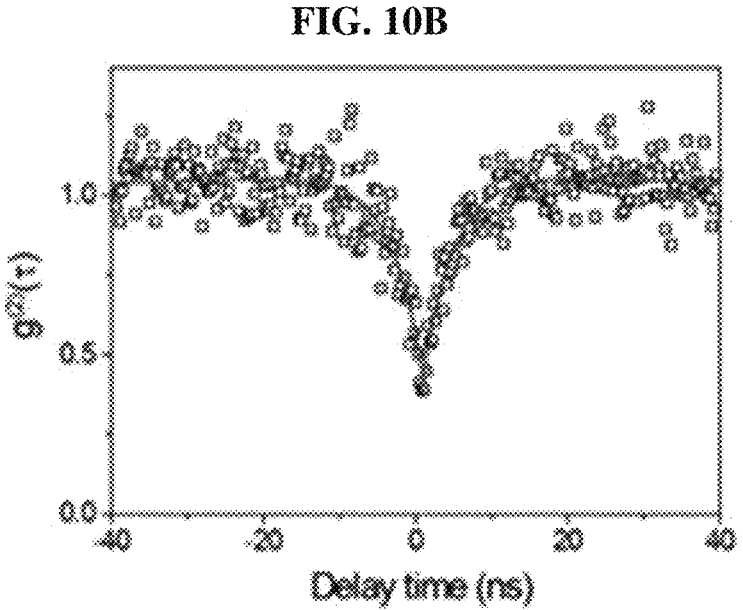
FIG. 10B shows a photon-correlation function $g^{(2)}(t)$ according to t (ns) that is a delay time of a single-photon emitter (No. 1) of FIG. 9B.

FIG. 10B shows a photon-correlation function g$^{(2)}$(t) according to t (ns) that is a delay time of a single-photon emitter (No. 1) of FIG. 9B.

Referring to FIG. 10B, when the delay time is 0 ns, the value of g$^{(2)}$(0) is 0.384±0.095, so it can be seen that the photonic device assembly according to an embodiment of the present disclosure also emits a single photon.

Figure 10C:
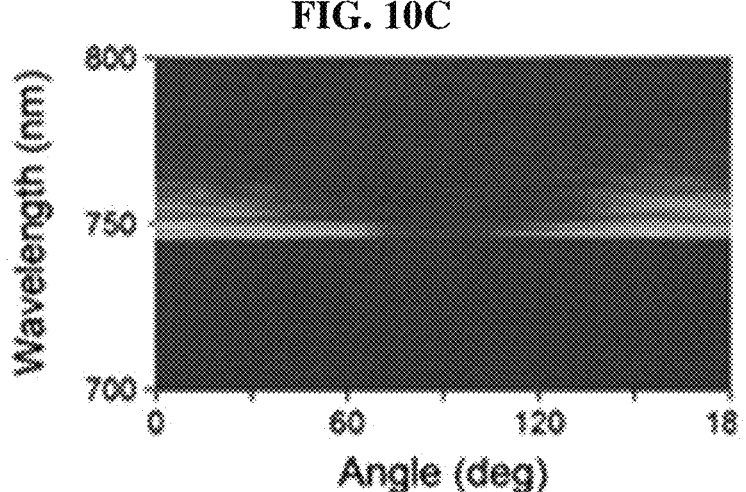
FIG. 10C shows a photoluminescence spectrum measured in accordance with the angle of a polarizer on the basis of the single-photon emitter (No. 3) of FIG. 9B.

FIG. 10C shows a photoluminescence spectrum measured in accordance with the angle of a polarizer on the basis of the single-photon emitter (No. 3) of FIG. 9B.

Referring to FIG. 10C, the single-photon emitter (No. 3) shows a linearly polarized direction along a rod structure made of Si$_3$N$_4$. Consequently, it can be seen that polarization matching of a single-photon emitter and a cavity mode is mad well.

Figure 10D:
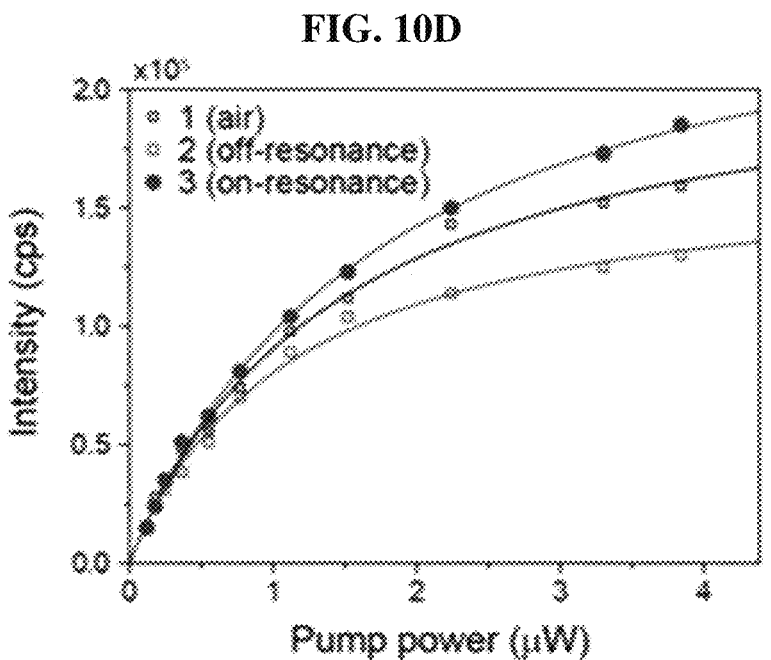
FIG. 10D shows the strength of photoluminescence intensity measured for a single-photon emitter 1 (black-line), a single-photon emitter 2 (red-line), and a single-photon emitter 3 (blue-line) as a function of photoluminescence intensity according to pump laser power.

FIG. 10D shows the strength of photoluminescence intensity measured for a single-photon emitter 1 (black-line), a single-photon emitter 2 (red-line), and a single-photon emitter 3 (blue-line) as a function of photoluminescence intensity according to pump laser power.

Referring to FIG. 10D, it can be seen that the fitting curves show saturated pump power of 1.45 μW (black-line), 1.11 μW (red-line), and 1.74 μW (blue-line) and show saturated discharge strengths of $2.22 \times 10^5$ count/s (black-line), $1.70 \times 10^5$ count/s (red-line), and $2.67 \times 10^5$ count/s (blue-line). Consequently, it can be seen that the single-photon emitter 3 is coupled with a photonic crystal and shows higher photoluminescence intensity than the single-photon emitter 1 not coupled with a photonic crystal cavity, and it is possible to implement a device of which emission efficiency of a single photon is improved through the photonic device assembly according to the present disclosure.

Although embodiments of the present disclosure were described above in detail, the spirit of the present disclosure is not limited thereto and the present disclosure may be changed and modified in various ways on the basis of the basic concept without departing from the scope of the present disclosure described in the following claims.

What is claimed is:

1. A nanostructure of controlling a single photon, the nanostructure comprising:

a substrate; and a first insulating film and a second insulating film spaced apart from each other in a first direction, on the substrate; and a first nanogap between the first insulating film and the second insulating film, wherein a monolayer transition metal dichalcogenide (TMDC) covers the first nanogap, and wherein a width of the first nanogap in the first direction is 110 to 150 nm.

2. The nanostructure of claim 1, wherein the transition metal dichalcogenide includes any one selected from a group of $WSe_2$, $WS_2$, $MoSe_2$, $MoS_2$, $MoTe_2$, and combinations thereof.

3. The nanostructure of claim 1, wherein a width of the first nanogap in the first direction is 110 to 130 nm.

4. The nanostructure of claim 1, wherein the monolayer TMDC is configured to polarize the single photon in a second direction perpendicular to the first direction at the first nanogap.

5. The nanostructure of claim 1, wherein the substrate is any one selected from a group of silicon, a SOI (silicon on insulator), $SiO_2$, silicon germanium, an indium antimonide, a lead-telluride compound, an indium arsenide, an indium phosphide, a gallium arsenide, a gallium antimonide, and combinations thereof.

6. The nanostructure of claim 1, wherein the insulating film unit is a silicon nitride film or a silicon oxynitride film.

7. A photonic device assembly comprising:

the nanostructure controlling a single photon of claim 1; and a photonic crystal resonator disposed on the nanostructure controlling a single photon.

8. A method of manufacturing a nanostructure controlling a single photon, the method comprising:

forming a first insulating film and a second insulating film spaced apart from each other in a first direction on a substrate; and transcribing a monolayer transition metal dichalcogenide on the nanostructure using a stamping method, wherein a first nanogap is formed between the first insulating film and the second insulating film, wherein the monolayer transition metal dichalcogenide covers the first nanogap, and wherein a width of the first nanogap in the first direction is 110 to 150 nm.

9. The method of claim 8, wherein the stamping method is a method of performing transcription on a polydimethylsiloxane stamp.

10. The method of claim 8, wherein a strain is applied to the monolayer transition metal dichalcogenide at the first nanogap by the stamping method.

* * * * *